(12) United States Patent
Marosi et al.

(10) Patent No.: US 10,017,305 B2
(45) Date of Patent: *Jul. 10, 2018

(54) VACUUM SYSTEM AND SEAL

(71) Applicant: Marosi Designs LLC, Naperville, IL (US)

(72) Inventors: Jason Russell Marosi, Aurora, IL (US); Adam Mark Marosi, Naperville, IL (US)

(73) Assignee: Marosi Designs LLC, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,944

(22) Filed: Oct. 18, 2016

(65) Prior Publication Data

US 2017/0036830 A1   Feb. 9, 2017

Related U.S. Application Data

(63) Continuation of application No. 14/533,548, filed on Nov. 5, 2014, now Pat. No. 9,475,627.

(51) Int. Cl.
| | |
|---|---|
| *B65D 53/00* | (2006.01) |
| *B65D 53/02* | (2006.01) |
| *B65D 53/04* | (2006.01) |
| *B65D 43/02* | (2006.01) |
| *B65D 81/20* | (2006.01) |
| *F16J 13/02* | (2006.01) |

(52) U.S. Cl.
CPC ......... *B65D 53/02* (2013.01); *B65D 43/0202* (2013.01); *B65D 53/04* (2013.01); *B65D 81/2015* (2013.01); *F16J 13/02* (2013.01)

(58) Field of Classification Search
None
See application file for complete search history.

(56) References Cited

U.S. PATENT DOCUMENTS

| | | | |
|---|---|---|---|
| 1,339,636 A | 5/1920 | Tulloch |
| 1,857,853 A | 5/1932 | McMann |
| 1,904,091 A | 4/1933 | Shoop |
| 3,768,819 A | 10/1973 | Bürkert |
| 5,469,979 A | 11/1995 | Chiou |
| 5,546,997 A | 8/1996 | Miramon |
| 5,641,085 A | 6/1997 | Lonbardo |
| 5,735,317 A | 4/1998 | Wu |
| 5,779,082 A | 7/1998 | Miramon |
| 5,833,245 A | 11/1998 | Gallagher |
| 6,131,753 A | 10/2000 | Lynch |
| 6,286,838 B1 | 9/2001 | Krüger et al. |

(Continued)

*Primary Examiner* — Andrew T Kirsch
*Assistant Examiner* — Don M Anderson
(74) *Attorney, Agent, or Firm* — Fitch, Even, Tabin & Flannery, LLP

(57) ABSTRACT

A vacuum chamber system is provided which includes a vacuum chamber body, a lid, and an elastomeric sealing element. The elastomeric sealing may be positioned about the lid. The elastomeric sealing element includes a body having a base portion positioned between a first arm and a second arm. Each of the first and second arms have inner lid contacting surfaces and outer surfaces. The elastomeric sealing element has a generally U-shaped transverse cross-section defined by the base portion and the first and second arms, and is generally reversible between first and second configurations.

19 Claims, 8 Drawing Sheets

(56) References Cited

U.S. PATENT DOCUMENTS

| | | |
|---|---|---|
| 6,905,125 B2 | 6/2005 | Shibata et al. |
| 6,945,014 B1 | 9/2005 | Quann |
| 9,475,627 B2 * | 10/2016 | Marosi .................. B65D 53/04 |
| 2007/0023434 A1 | 2/2007 | Kim |
| 2012/0085765 A1 | 4/2012 | Lan |
| 2015/0102035 A1 | 4/2015 | Tuan |

* cited by examiner

VACUUM SYSTEM AND SEAL

CROSS-REFERENCE TO RELATED APPLICATIONS

This application is a continuation of prior application Ser. No. 14/533,548, filed Nov. 5, 2014, now U.S. Pat. No. 9,475,627 B2 issued Oct. 25, 2016.

FIELD

The present application generally relates to vacuum systems and, more particularly, to vacuum systems including an elastomeric sealing element that is configured for use in first and second configurations that are generally reversible.

BACKGROUND

Pressure containing systems and vacuum systems are generally known in the art and are used for a variety of purposes. For example, pressure vessels can be used to maintain a higher relative pressure in a chamber to cause gases and the like to become entrapped within another material. Vacuum systems may also be used for a variety of purposes including, but not limited to, extracting oils from plant materials and the like.

Generally, to provide a proper fit and seal between various components in the systems, one or more gaskets may be used to help prevent gases from entering and/or exiting the systems. For example, oftentimes a gasket is provided between a lid or manifold and the main body of the system. Such gaskets come in a variety of forms, may be made from a variety of different materials, and positioned in a variety of different locations.

However, prior gaskets and/or seals suffer from a number of deficiencies. For example, many times the gaskets and/or seals are installed at the factory and are not easily user replaceable. In one form, a seal may be permanently affixed to the system such that a user cannot easily remove, clean, and/or replace the seal. In another form, a seal may be positioned in a groove such that even if removed by a user, may still require replacement by the factory to ensure that the seal is properly installed and positioned.

These issues can be problematic as a user cannot easily remove the seal, such as when the seal needs to be cleaned and/or replaced because of use, age, failure, and the like. Seals oftentimes have limited lifespans due to the materials they come into contact with, the stresses they are put under during use, damage caused when the system is assembled and the like. For example, portions of the seal may be subjected to localized stresses and/or pinching that can cause tears, premature failure, and the like.

Furthermore, seals are often designed with strict tolerances such that the components of the system must be precisely aligned during installation and use. If one of the components is slightly out of alignment, the seal may not make full contact and thus permit leaking. Similarly, seals are often designed for a component having a very specific size. This may be problematic since, even if the seal is replaceable, a user may need to stock a large number of different seals for systems having minor size variations.

In view of the above, there are a number of issues that often arise with prior systems and seals. Therefore, it may be desirable to provide a seal that may be more easily installed by a user, may extend the useful life of the seal and/or permit use in a variety of differently sized and configured systems.

SUMMARY

In one form, a vacuum chamber system is provided that includes a sealing element that may be installed in a first configuration and then reversed to a second configuration, thereby permitting the sealing element to have double the useful life of a sealing element that was not reversible. According to one form, the sealing element is configured to accommodate a variety of differently sized and/or shaped systems to cut down on the need for multiple sealing elements of different sizes. Furthermore, in one form, the system and sealing element may be configured such that the sealing element is only contacted by mating surfaces on one side of the sealing element to avoid disproportionate stresses on the sealing element. Moreover, such a configuration may permit the sealing element to be reversed such that a side of the sealing element may be positioned between mating surfaces that had not previously been subjected to significant stresses, such as between any other mating surfaces.

In accordance with one form, the vacuum chamber system includes a vacuum chamber body, a lid, and an elastomeric sealing element. The vacuum chamber body has peripheral sidewalls and a chamber sealing surface. The lid has an upper surface, a lower surface, and a peripheral edge between the upper and lower surfaces. The elastomeric sealing element is positioned about the lid. The elastomeric sealing element includes a body having a base portion positioned between a first radially extending arm and a second radially extending arm. Each of the first and second radially extending arms have inner lid contacting surfaces and outer surfaces. In a first configuration, the lid contacting surface of the first radially extending arm contacts the lower surface of the lid, the outer surface of the first radially extending arm contacts the chamber sealing surface, and the lid contacting surface of the second radially extending arm contacts the upper surface of the lid. In a second configuration, the lid contacting surface of the second radially extending arm contacts the lower surface of the lid, the outer surface of the second radially extending arm contacts the chamber sealing surface, and the lid contacting surface of the first radially extending arm contacts the upper surface of the lid. Further, the elastomeric sealing element has a generally U-shaped transverse cross-section defined by the base portion and the first and second radially extending arms.

In accordance with one form, a vacuum chamber system is provided. The vacuum chamber system includes a vacuum chamber body, a lid, and an elastomeric sealing surface. The vacuum chamber body has peripheral sidewalls and an annular chamber sealing surface. The lid has an upper surface, a lower surface, and a peripheral edge between the upper and lower surfaces. The elastomeric sealing element is positioned about the lid. The elastomeric sealing element includes an annular body having a base portion positioned between a first radially extending arm and a second radially extending arm. Each of the first and second radially extending arms have inner lid contacting surfaces and outer surfaces and are positioned generally parallel to one another. In a first configuration, the lid contacting surface of the first radially extending arm contacts the lower surface of the lid, the outer surface of the first radially extending arm contacts the chamber sealing surface, and the lid contacting surface of the second radially extending arm contacts the upper surface of the lid. In a second configuration, the lid contacting surface of the second radially extending arm contacts the lower surface of the lid, the outer surface of the second radially extending arm contacts the chamber sealing surface, and the lid contacting surface of the first radially extending arm contacts the upper surface of the lid. Further, the elastomeric sealing element has a generally U-shaped transverse cross-section defined by the base portion and the first and second radially extending arms and the base portion does not contact the vacuum chamber when in either the first or second configurations.

According to one form, a seal for vacuum chamber system is provided. The vacuum chamber system includes a vacuum chamber body and a lid. The vacuum chamber body has peripheral sidewalls and an annular chamber sealing surface, and the lid has an upper surface, a lower surface, and a peripheral edge between the upper and lower surfaces. The seal includes an elastomeric sealing element configured to be positioned about the lid. The elastomeric sealing element includes an annular body having a base portion positioned between a first radially extending arm and a second radially extending arm. Each of the first and second radially extending arms have inner lid contacting surfaces and outer surfaces and are positioned generally parallel to one another. In a first configuration, the lid contacting surface of the first radially extending arm is configured to contact the lower surface of the lid, the outer surface of the first radially extending arm is configured to contact the chamber sealing surface, and the lid contacting surface of the second radially extending arm is configured to contact the upper surface of the lid. In a second configuration, the lid contacting surface of the second radially extending arm is configured to contact the lower surface of the lid, the outer surface of the second radially extending arm is configured to contact the chamber sealing surface, and the lid contacting surface of the first radially extending arm is configured to contact the upper surface of the lid. Further, the elastomeric sealing element has a generally U-shaped transverse cross-section defined by the base portion and the first and second radially extending arms and the base portion is configured to avoid contact with the vacuum chamber when in either the first or second configurations.

In one form, a vacuum chamber system is provided. The vacuum chamber system includes a vacuum chamber body, a lid, and an elastomeric sealing element. The vacuum chamber body has peripheral sidewalls and an end wall including a chamber sealing surface and an exterior surface. The lid has an upper surface, a lower surface, and a peripheral edge between the upper and lower surfaces. The elastomeric sealing element is positioned about the end wall. The elastomeric sealing element includes a body having a base portion positioned between a first radially extending arm and a second radially extending arm. Each of the first and second radially extending arms have inner chamber contacting surfaces and outer surfaces. In a first configuration, the chamber contacting surface of the first radially extending arm contacts the chamber sealing surface, the outer surface of the first radially extending arm contacts the lower surface of the lid, and the chamber contacting surface of the second radially extending arm contacts the exterior surface. In a second configuration, the chamber contacting surface of the second radially extending arm contacts the chamber sealing surface, the outer surface of the second radially extending arm contacts the lower surface of the lid, and the chamber contacting surface of the first radially extending arm contacts the exterior surface. Further, the elastomeric sealing element has a generally U-shaped transverse cross-section defined by the base portion and the first and second radially extending arms.

According to one form, the chamber sealing surface is annular and the elastomeric sealing element is annular.

In one form, the base contacts the peripheral edge of the lid to cooperate with the first and second radially extending arms to retain the elastomeric sealing element on the lid in both the first and second configurations without requiring an adhesive or a grooved surface.

In accordance with one form, at least one of the first and second radially extending arms has a length extending in a radial direction suitable for contacting chamber sealing surfaces having varying diameters.

According to one form, at least a portion of the upper surface and lower surface of the lid is generally flat and parallel to one another to contact the first and second radially extending arms.

In one form, the elastomeric sealing element is selected from the group consisting of silicone, nitrile rubber, polytetrafluoroethylene, ethylene propylene diene monomer rubber, neoprene, fluoroelastomers, perfluoroelastomers, and combinations thereof and has a durometer between about 40-60 A.

In accordance with one form, the elastomeric sealing element is reversible between the first and second configurations.

According to one form, the base does not contact the chamber body in either of the first and second configurations.

In one form, the first and second radially extending arms are positioned generally parallel to one another.

These and other aspects may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
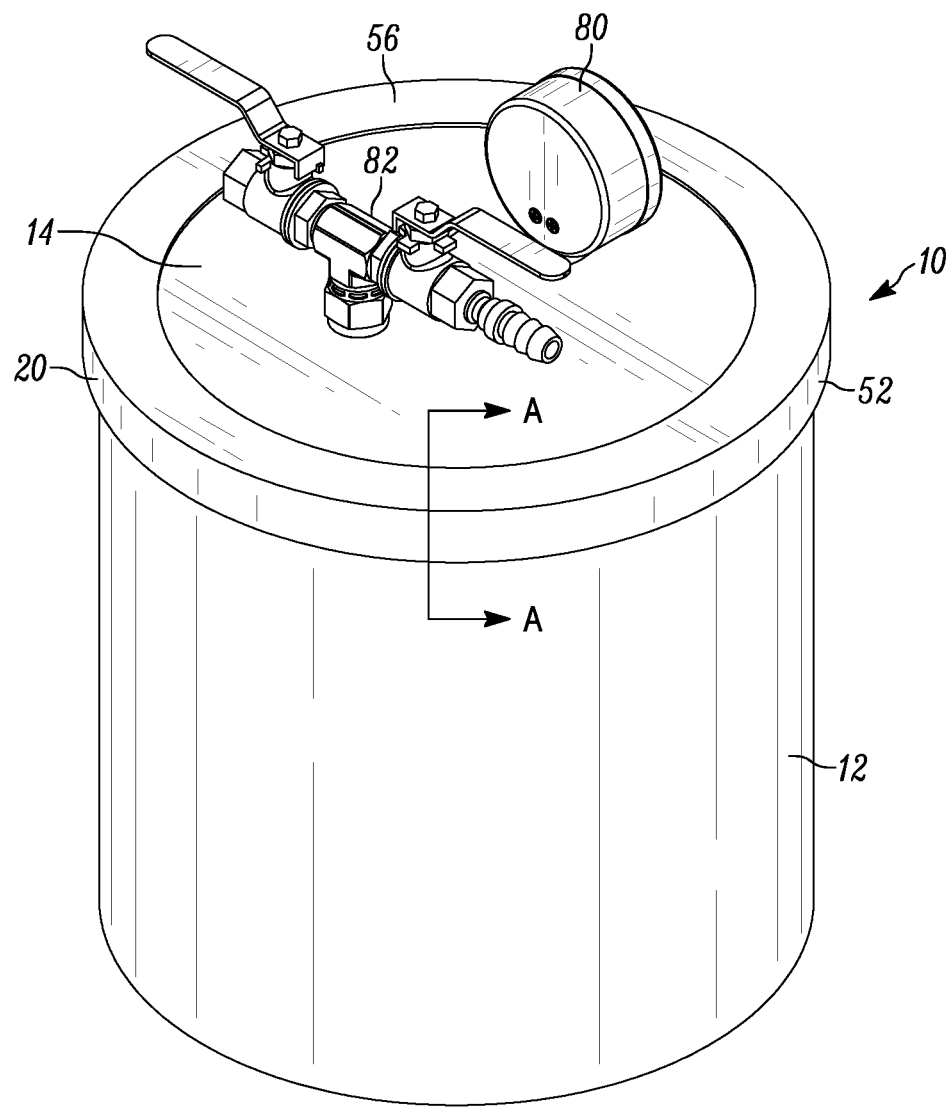
FIG. 1 is a perspective view of one form of a vacuum chamber system.
Figure 2:
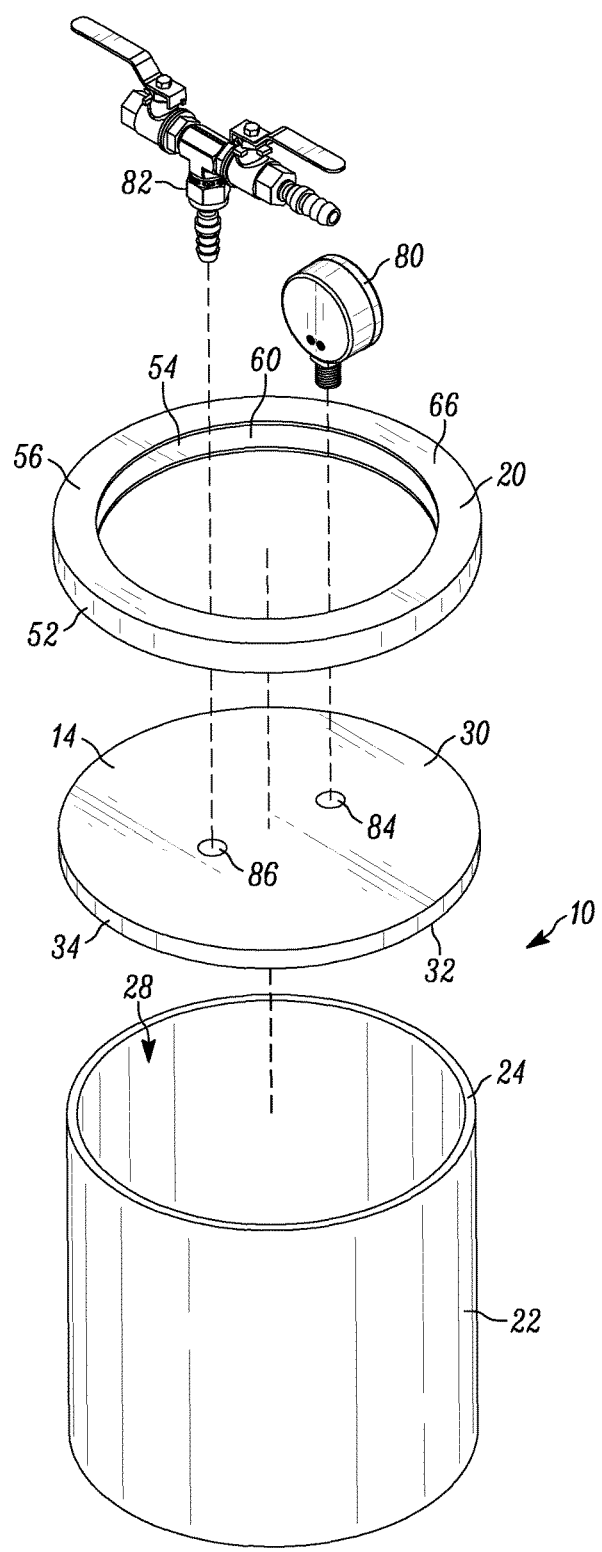
FIG. 2 is an exploded view of the vacuum chamber system of FIG. 1.

Referring to FIGS. 1 and 2, there is illustrated a vacuum chamber system generally designated by the numeral 10. The vacuum chamber system 10 includes a vacuum chamber body 12, a lid 14, and an elastomeric sealing element 20. The vacuum chamber system 10 may also include additional structures and features as will be understood in view of the following description.

The vacuum chamber body 12 may include a variety of different bodies, chambers, vessels and the like suitable for use in a vacuum system. In one form, the vacuum chamber body 12 includes peripheral sidewalls 22 and a chamber sealing surface 24. In one form, the chamber sealing surface 24 is generally flat to provide one configuration of a sealing surface. However, the chamber sealing surface may take a form other than flat so long as it cooperates and/or mates with other structures in the vacuum chamber system 10, such as the lid 14. The vacuum chamber body 12 may also include a bottom wall 26. The sidewalls 22 and bottom wall 26 generally define a chamber 28 suitable for containing a variety of different materials, such as plants, foods, and other materials a user would like to place under a vacuum. The chamber 28 may be a variety of sizes as desired. For example, the chamber 28 may be approximately 0.5 gal., 1 gal., 2 gal., 3 gal., 4 gal., 5 gal., 6 gal., 7 gal., 8 gal., 9 gal., 10 gal., 11 gal., 12 gal., 13 gal., 14 gal., 15 gal., and the like. Further, the chamber may be larger or smaller.

The vacuum chamber body 12 may also have a variety of shapes and sizes, as will be understood by those skilled in the art. For example, as shown in FIGS. 1 and 2, the vacuum chamber body 12 is generally cylindrical. However, other shapes, sizes, dimensions, and the like may also be utilized. Similarly, in one form, such as shown in FIGS. 1 and 2, the chamber sealing surface 24 is generally annular. However, the chamber sealing surface 24 may also take a variety of shapes, sizes, dimensions, thicknesses, and the like.

The lid 14 generally includes an upper surface 30, a lower surface 32, and a peripheral edge 34 between the upper and lower surfaces 30,32. In one form, the lid 14 is shown as having a generally annular shape. However, it should be appreciated that the lid 14 may take a variety of other shapes such as shown by lids 40,42,44,46 in FIGS. 6a-6d. For example, the lids may be square, rectangular, triangular, octagonal, and the like. Other shapes are also contemplated as understood by those skilled in the art.

Figure 3:
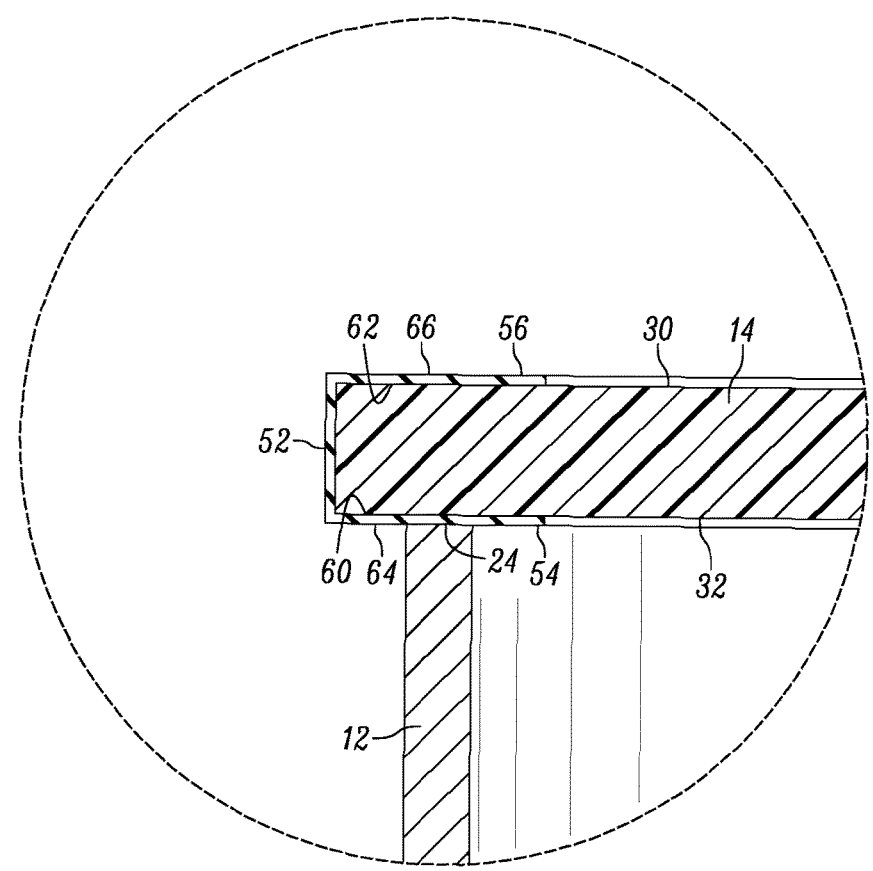
FIG. 3 is a cross-sectional view of a portion of the vacuum chamber system of FIG. 1 taken alone line A-A.

In one form, such as shown in FIG. 3, the upper and lower surfaces 30,32 are generally flat. However, the surfaces 30,32 may take other forms. In one form, the lower surface 32 is configured to generally mate with the chamber sealing surface 24. In this regard, these surfaces 24,32 should be configured to cooperate with each other so as to generally mate with one another and help provide a suitable sealing connection.

In one form, the elastomeric sealing element 20 includes a body 50 having a base portion 52, a first arm 54, and a second arm 56 with the base portion 52 positioned between the first and second arms 54,56. Each of the first and second arms 54,56 include inner lid contacting surfaces 60,62 and outer surfaces 64,66. It should be understood that the arms 54,56 may be radially extending, such as in the form of an annular sealing element, or otherwise extend inwardly relative to the base portion 52 in the case of other shapes. Further, the arms 54,56 generally have a length that is configured to cooperate at the mating connection between the lid 14 and the vacuum chamber body 12. In this regard, in one form, the arms 54,56 have a length that is configured to accommodate a variety of different sized lids and/or chambers and otherwise accommodate slight misalignment between the lid and chamber. For example, in one form the curves have a length that is at least about 10 mm, 15 mm, 20 mm, 25 mm, 30 mm, 35 mm, 40 mm, 45 mm, and the like. It should be understood that the arms 54,56 may have different lengths from one another or the same lengths.

In one form, such as seen in FIG. 3, the elastomeric sealing element 20 may have a generally U-shaped cross-section. In this form, the first and second arms 54,56 generally extend parallel to one another and away from the base 52. However, it should be appreciated that the arms 54,56 may extend at other angles relative to one another.

Further, the elastomeric sealing element may take a variety of shapes and sizes. As shown in FIGS. 1 and 2, the elastomeric sealing element is generally annular. This annular form may be suitable for accommodating a variety of differently shaped lids due to the elastomeric properties. Alternatively, the elastomeric sealing element may take a variety of other shapes as shown in FIGS. 6a-6d. As shown in these figures, the elastomeric sealing elements 70,72,74, 76 may be square, rectangular, triangular, octagonal, and the like. Other shapes and sizes are also contemplated.

The elastomeric sealing element may be made from a variety of different materials. For example, the elastomeric sealing element may include materials selected from the group consisting of silicone, nitrile rubber, polytetrafluoroethylene, ethylene propylene diene monomer rubber, neoprene, fluoroelastomers, perfluoroelastomers, and combinations thereof. In one form, the elastomeric sealing element is made from silicone.

Similarly, the elastomeric sealing element may have a variety of properties and characteristics. For example, in one form, the elastomeric sealing element may have a durometer of between about 40-60 A. According to one form, the elastomeric sealing element may have a thickness of between about 1.5 and about 2.5 mm.

The vacuum chamber system 10 may also include other features and structures as would be understood by those skilled in the art. For example, in one form, such as shown in FIGS. 1 and 2, the system 10 may include a vacuum gauge 80, a plumbing assembly 82, and the like. In this form, the vacuum gauge 80 and plumbing assembly are shown coupled to the lid 14 via ports 84 and 86. However, it should be understood that the vacuum gauge 80 and plumbing assembly 82 may also and/or alternatively be coupled to the chamber body 12. The system 10 may include other features such as inlets, outlets, valves, connections, and the like which may be coupled to any of the components in the system 10.

Figure 4A:
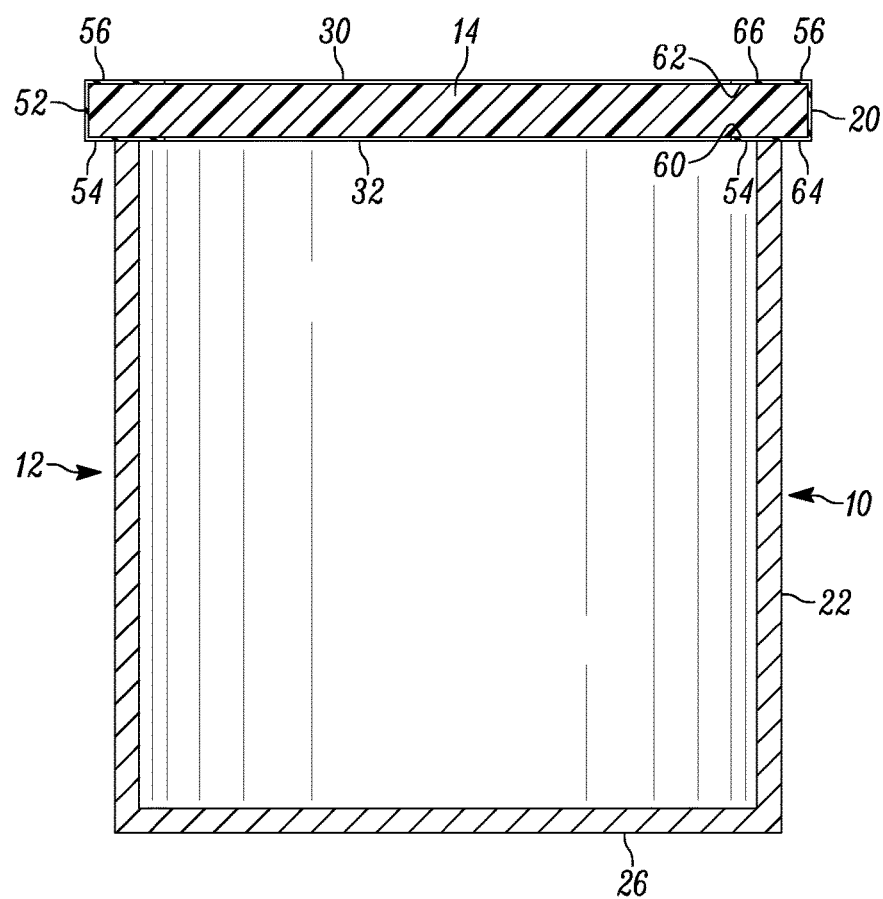
FIG. 4a is a cross-sectional view of an elastomeric sealing element installed on a lid in a first configuration.
Figure 4B:
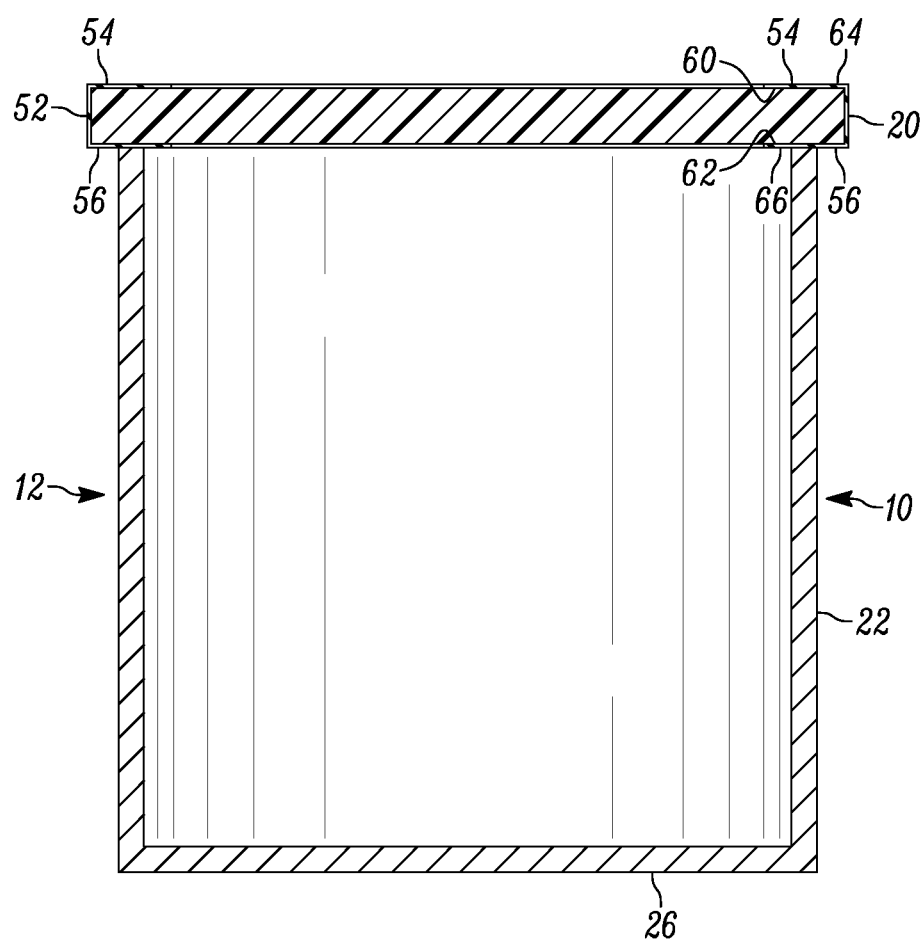
FIG. 4b is a cross-sectional view of the elastomeric sealing element of FIG. 4a installed on the lid in a second configuration.

In one form, the elastomeric sealing element 20 is configured to be positioned about the lid 14, such as shown in FIG. 1. The elastomeric sealing element 20 is positionable about the lid 14 in a first configuration, as shown in FIG. 4a, and a second configuration, as shown in FIG. 4b. In the first configuration shown in FIG. 4a, the lid contacting surface 60 of the first arm 54 contacts the lower surface 32 of the lid 14, the outer surface 64 of the first arm 54 contacts the chamber sealing surface 24, and the lid contacting surface 62 of the second arm 56 contacts the upper surface 30 of the lid 14.

In the second configuration, the lid contacting surface 62 of the second arm 56 contacts the lower surface 32 of the lid 14, the outer surface 66 of the second arm 56 contacts the chamber sealing surface 24, and the lid contacting surface 60 of the first arm 54 contacts the upper surface 30 of the lid 14. In this regard, the elastomeric sealing element 20 is generally reversible between the first and second configurations.

Furthermore, in one form, the elastomeric sealing element 20 does not require any adhesives to be held in place. Instead, the shape of the element 20, such as the base 52, cooperates with the lid 14 to maintain the element 20 in place. The base 52 may also be configured and installed on the lid 14 so that it generally does not contact the vacuum chamber body 22. In other words, only one of the first and second arms 54,56 contacts the vacuum chamber body 22 when installed in a specific configuration. This can help avoid extra stresses on the elastomeric sealing element.

Additionally, in one form, at least a portion of the lid 14, such as a peripheral edge of the lower surface 32, is generally flat to cooperate with the elastomeric sealing element 20. In this form, the remainder of the lower surface 32 need not be flat. Furthermore, the shape and length of at least one of the arms 54,56 is configured to permit slight misalignment of one of the lid 14 and sealing element 20 while still providing a satisfactory seal. In other words, the shape, position, and size of the element is such that it will still seal even if misaligned. Similarly, the shape and length of at least one of the arms 54,56 is configured to function on a variety of sized and/or shaped lids and still provide a satisfactory seal.

Figure 5:
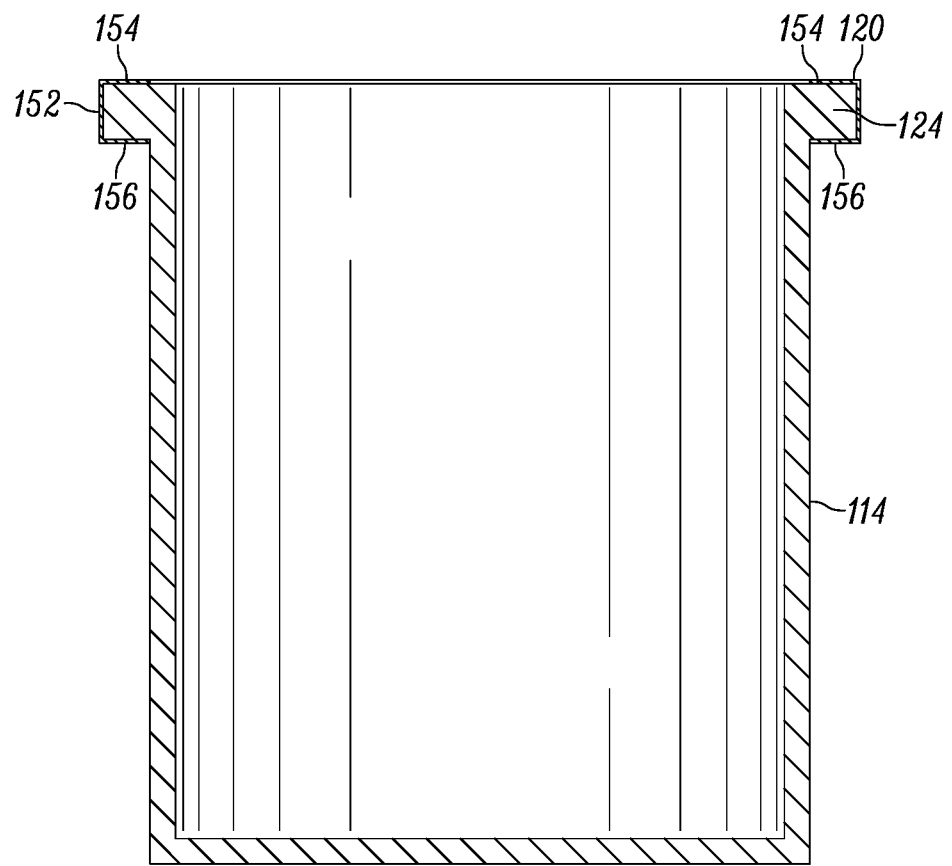
FIG. 5 is a view of another form of a vacuum chamber system with an elastomeric sealing element installed on a vacuum chamber body.
Figure 6A:
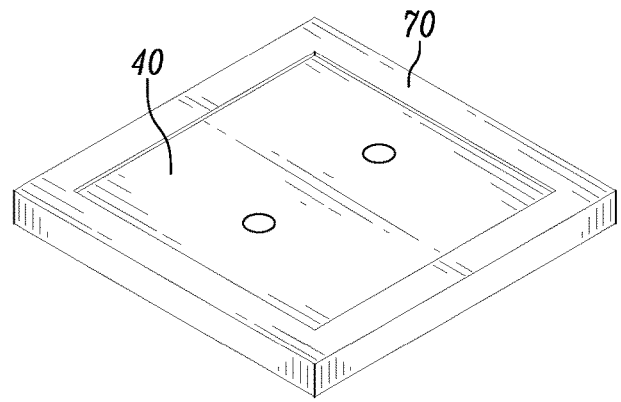
FIGS. 6a-6d are top views of alternative shaped lids and elastomeric sealing elements.
Figure 6B:
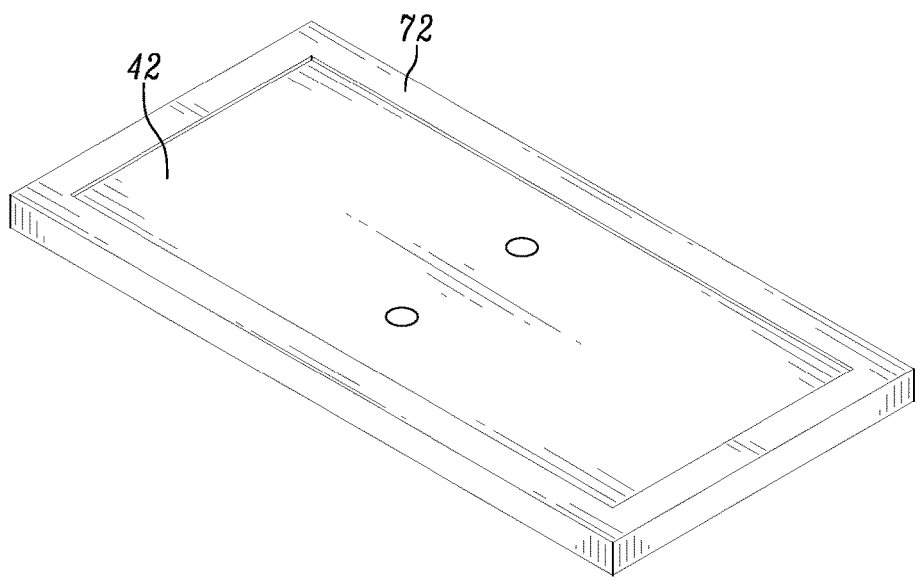
Figure 6C:
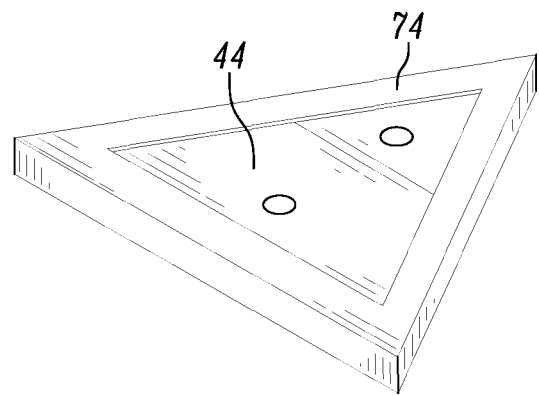
Figure 6D:
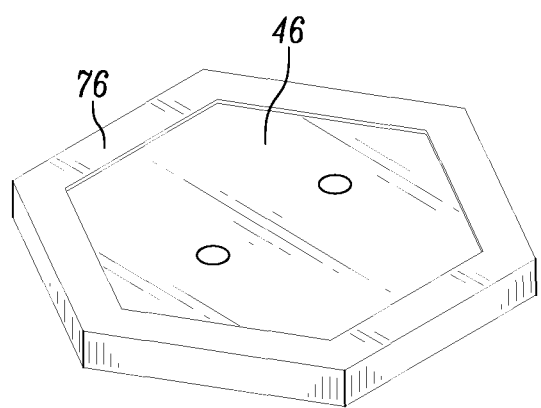

In yet another form, such as shown in FIG. 5, an elastomeric sealing element 120 may be configured to be positionable about a vacuum chamber body 114 instead of the lid. The elastomeric sealing element 120 can be positionable about a chamber sealing surface 124. The elastomeric sealing element 120 may be similar to elastomeric sealing element 20 and may include a base 152, a first arm 154, and a second arm 156, and have a generally U-shaped cross-section. The chamber sealing surface 124 may take a variety of forms similar to the chamber sealing surface 24.

Further, the chamber sealing surface 124 may take the form of a flange and the like configured to cooperate with the generally U-shaped cross-section of the elastomeric sealing element 120. Further, the elastomeric sealing element may be reversible between first and second configurations on the vacuum chamber body, similar to the elastomeric sealing element 20 on the lid 14. It should be noted that the elastomeric sealing element 120 is only shown in the first configuration in FIG. 5.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A chamber system comprising:
   a chamber body having at least one peripheral sidewall and a chamber sealing surface;
   a lid having an upper surface, a lower surface and a peripheral edge between the upper and lower surfaces; and
   an elastomeric sealing element positioned about at least portion of the lid, the elastomeric sealing element including a body having a base portion positioned between a first arm and a second arm, each of the first and second arms having lid contacting surfaces and outer surfaces,
      in a first configuration, the lid contacting surface of the first arm contacts the lower surface of the lid, the outer surface of the first arm faces the chamber sealing surface, and the lid contacting surface of the second arm contacts the upper surface of the lid,
      in a second configuration, the lid contacting surface of the second arm contacts the lower surface of the lid, the outer surface of the second arm faces the chamber sealing surface, and the lid contacting surface of the first arm contacts the upper surface of the lid,
   wherein the base does not contact the chamber body in either of the first and second configurations when the lid is coupled to and in a sealing configuration with the chamber body.

2. The chamber system of claim 1 wherein the chamber sealing surface is annular and the elastomeric sealing element is annular.

3. The chamber system of claim 1 wherein the base contacts the peripheral edge of the lid to cooperate with the first and second arms to retain the elastomeric sealing element on the lid in both the first and second configurations without requiring an adhesive or a grooved surface.

4. The chamber system of claim 1 wherein at least one of the first and second arms has a length extending in a radial direction suitable for contacting chamber sealing surfaces having varying diameters.

5. The chamber system of claim 1 wherein at least a portion of the upper surface and lower surface of the lid is generally flat and parallel to one another to contact the first and second radially extending arms.

6. The chamber system of claim 1 wherein the elastomeric sealing element is selected from the group consisting of silicone, nitrile rubber, polytetrafluoroethylene, ethylene propylene diene monomer rubber, neoprene, fluoroelastomers, perfluoroelastomers, and combinations thereof and has a durometer between about 40-60 A.

7. The chamber system of claim 1 wherein the elastomeric sealing element is reversible between the first and second configurations.

8. The chamber system of claim 1 wherein the first and second arms are positioned generally parallel to one another.

9. A seal for a chamber system including a chamber body and a lid, the chamber body having at least one peripheral sidewall and an annular chamber sealing surface and the lid having an upper surface, a lower surface, and a peripheral edge between the upper and lower surfaces, the seal comprising:
   an elastomeric sealing element configured to be positioned about the lid, the elastomeric sealing element including an annular body having a base portion positioned between a first radially extending arm and a second radially extending arm, each of the first and second radially extending arms having inner lid contacting surfaces and outer surfaces and are positioned generally parallel to one another,
      in a first configuration, the lid contacting surface of the first radially extending arm is configured to contact the lower surface of the lid, the outer surface of the first radially extending arm is configured to face the chamber sealing surface, and the lid contacting surface of the second radially extending arm is configured to contact the upper surface of the lid,
      in a second configuration, the lid contacting surface of the second radially extending arm is configured to contact the lower surface of the lid, the outer surface of the second radially extending arm is configured to face the chamber sealing surface, and the lid contacting surface of the first radially extending arm is configured to contact the upper surface of the lid,
   wherein the base portion is configured to avoid contact with the chamber when in either the first or second configurations when the lid is coupled to and in a sealing configuration with the chamber body.

10. The seal of claim 9 wherein the base is configured to contact the peripheral edge of the lid to cooperate with the first and second radially extending arms to retain the elastomeric sealing element on the lid in both the first and second configurations without requiring an adhesive or a grooved surface.

11. The seal of claim 9 wherein at least one of the first and second radially extending arms has a length extending in a radial direction suitable for contacting chamber sealing surfaces having varying diameters.

12. The seal of claim 9 wherein the elastomeric sealing element is selected from the group consisting of silicone, nitrile rubber, polytetrafluoroethylene, ethylene propylene diene monomer rubber, neoprene, fluoroelastomers, perfluoroelastomers, and combinations thereof and has a durometer between about 40-60 A.

13. A chamber system comprising:
a chamber body having at least one peripheral sidewall and an end wall including an upper chamber sealing surface and a lower surface generally opposite the upper chamber sealing surface;
a lid having a lower surface;
an elastomeric sealing element positioned about the end wall, the elastomeric sealing element including a body having a base portion positioned between a first radially extending arm and a second radially extending arm, each of the first and second radially extending arms having inner chamber contacting surfaces and outer surfaces,
in a first configuration, the chamber contacting surface of the first radially extending arm contacts the upper chamber sealing surface, the outer surface of the first radially extending arm faces the lower surface of the lid, and the chamber contacting surface of the second radially extending arm contacts the lower surface of the chamber body,
in a second configuration, the chamber contacting surface of the second radially extending arm contacts the upper chamber sealing surface, the outer surface of the second radially extending arm faces the lower surface of the lid, and the chamber contacting surface of the first radially extending arm contacts the lower surface of the chamber body,
wherein the base does not contact the lid in either of the first and second configurations when the lid is coupled to and in a sealing configuration with the chamber body.

14. The chamber system of claim 13 wherein the base portion of the elastomeric sealing element does not contact the lid in either of the first and second configurations.

15. The chamber system of claim 13 wherein the end wall further comprises a peripheral edge positioned between the upper chamber sealing surface and the lower surface, wherein the peripheral edge contacts the base and cooperates with the first and second radially extending arms to retain the elastomeric sealing element on the end wall in both the first and second configurations without requiring an adhesive or a grooved surface.

16. The chamber system of claim 13 wherein at least one of the first and second radially extending arms has a length extending in a radial direction suitable for contacting lids having varying diameters.

17. The chamber system of claim 13 wherein at least a portion of the upper chamber sealing surface and lower surface of the end wall is generally flat and parallel to one another to contact the first and second radially extending arms.

18. The chamber system of claim 13 wherein the elastomeric sealing element is selected from the group consisting of silicone, nitrile rubber, polytetrafluoroethylene, ethylene propylene diene monomer rubber, neoprene, fluoroelastomers, perfluoroelastomers, and combinations thereof and has a durometer between about 40-60 A.

19. The chamber system of claim 13 wherein the elastomeric sealing element is reversible between the first and second configurations.

* * * * *